United States Patent
Zynda et al.

(10) Patent No.: US 9,327,434 B2
(45) Date of Patent: May 3, 2016

(54) METHOD FOR PRODUCING A REAR WALL OF A SEAT BACK

(75) Inventors: Martin Zynda, Burscheid (DE); Vedat Nuyan, Wuppertal (DE); Bernd Meier, Attendorn (DE); David Ribaric, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 456 days.

(21) Appl. No.: 13/821,285

(22) PCT Filed: Sep. 12, 2011

(86) PCT No.: PCT/EP2011/065775
§ 371 (c)(1),
(2), (4) Date: May 20, 2013

(87) PCT Pub. No.: WO2012/032189
PCT Pub. Date: Mar. 15, 2012

(65) Prior Publication Data
US 2013/0241108 A1    Sep. 19, 2013

(30) Foreign Application Priority Data
Sep. 10, 2010   (DE) .......................... 10 2010 044 948

(51) Int. Cl.
*B29C 45/14* (2006.01)
*B60N 2/68* (2006.01)
*B29L 31/00* (2006.01)

(52) U.S. Cl.
CPC ........... *B29C 45/14* (2013.01); *B29C 45/14786* (2013.01); *B60N 2/686* (2013.01); *B60N 2/688* (2013.01); *B29C 45/14336* (2013.01); *B29L 2031/771* (2013.01)

(58) Field of Classification Search
CPC .. B29C 45/14; B29C 45/14786; B29C 70/00; B29C 70/04; B29C 70/06; B29C 70/10; B29C 70/16; B29C 70/68; B29C 70/74; B29C 70/79
USPC ............................ 264/279, 259, 271.1, 318.1
See application file for complete search history.

(56) References Cited

U.S. PATENT DOCUMENTS 4,664,862 A * 5/1987 Ghavamikia .................. 264/257
5,029,942 A   7/1991 Rink
(Continued)

FOREIGN PATENT DOCUMENTS

DE    20 2008 015401 U1    4/2010
EP         0 372 339 B1       6/1990
(Continued)

OTHER PUBLICATIONS

First Office Action issued in corresponding Japanese Application No. 2013-527638 dated May 20, 2014 along with an English translation.
(Continued)

*Primary Examiner* — Christina Johnson
*Assistant Examiner* — Xue Liu
(74) *Attorney, Agent, or Firm* — Foley & Lardner LLP

(57) ABSTRACT

A method for producing a rear wall of a seat back from at least one organic sheet, includes back-moulding at least one organic sheet in an injection moulding tool with a rib structure, such that a bond is formed between the organic sheet and the rib structure, so that an integral component is formed.

16 Claims, 9 Drawing Sheets

(56) References Cited

U.S. PATENT DOCUMENTS

| | | | |
|---|---|---|---|
| 2005/0127577 A1* | 6/2005 | Clark et al. | 264/511 |
| 2008/0038569 A1 | 2/2008 | Evans et al. | |
| 2012/0261956 A1 | 10/2012 | Nasshan et al. | |

FOREIGN PATENT DOCUMENTS

| | | |
|---|---|---|
| EP | 2 490 920 A1 | 8/2012 |
| JP | 02-195908 A | 8/1990 |
| JP | 2010-500198 A | 1/2010 |
| WO | WO 2008/019981 A1 | 2/2008 |
| WO | WO-2011/029430 A2 | 3/2011 |

OTHER PUBLICATIONS

LANXESS Energizing Chemistry, "Technische Information: Organoblech—die Innovation in der Hybridtechnik"; found at: http://techcenter.lanxess.com/scp/emea/de/docguard/TI 2009-003 DE Organoblech.pdf?docId=12427922; dated Feb. 25, 2009.

Dr. Rolf Langbein' "Einsatz Organoblech forciert den Leichtbau in der Hybridtechnik", found at: http://www.autokon.de/home/-/article/16537511/29464061/Bauteile-immer-komplexerund-leichter/art__co_INSTANCE_OOOO/maximized; dated Aug. 23, 2010.

International Search Report in connection with international application No. PCT/EP2011/065775; dated Dec. 6, 2011.

Office Action dated Oct. 28, 2014, in corresponding Chinese application No. 201180043569.0, 6 pages.

Office Action dated Oct. 9, 2014, in corresponding European application No. 11 757 599.3, 5 pages.

* cited by examiner

METHOD FOR PRODUCING A REAR WALL OF A SEAT BACK

CROSS REFERENCE TO RELATED APPLICATIONS

The present application is a National Stage of International Application No. PCT/EP2011/065775 filed on Sep. 12, 2011, which claims the benefit of German Patent Application No. 10 2010 044 948.2 filed on Sep. 10, 2010, the entire disclosures of which are incorporated herein by reference.

FIELD

The invention relates to a method for producing a rear wall of a seat back in accordance with the features of the preamble of claim 1.

BACKGROUND

In the prior art, rear walls of seat backs are produced from what are known as organosheets. Organosheets are thermoplastic panels which are reinforced by endless fibers. Since the organosheet has a thermoplastic matrix, it can be fused and can be encapsulated by injection molding with the same thermoplastic. A distinction is made here between two methods. In the first method, preformed organosheets are inserted into an injection molding die and are encapsulated by injection molding with the thermoplastic. In the second method, the shaping of the organosheet takes place directly in the injection molding die.

BRIEF SUMMARY

The invention is based on the object of specifying an improved method for producing a rear wall of a seat back.

According to the invention, the object is achieved by a method for producing a rear wall of a seat back having the features of claim 1.

Preferred refinements and developments of the invention are specified in the dependent claims.

In the method for producing a rear wall of a seat back from at least one organosheet, according to the invention, at least one organosheet is overmolded in an injection molding die with a rib structure, a material-to-material connection being formed between the organosheet and the rib structure, with the result that a single-piece component is formed. Rear walls of seat backs which are produced by means of the method are advantageously of reduced weight and particularly flexurally stiff.

Headrest bushes, lock housings, belt deflection means, receptacles for a belt reel apparatus and/or lock receptacle regions are preferably molded into the rib structure. During the closing of the injection molding die, angled-over edges and/or brackets are particularly preferably shaped out on the organosheet by means of at least one slide. The integration of a plurality of forming and shaping-out operations, for example production of the angled-over edges and brackets, shaping out of the headrest bushes, belt deflection means and lock receptacles, into an injection molding die significantly reduces the production time of a rear wall of a seat back which is produced by means of the method according to the invention.

In one advantageous embodiment, the organosheet comprises a thermoplastic matrix and is connected to at least one rib structure made from a thermoplastic which forms a material-to-material connection with the material of the organosheet. Here, the rib structure is preferably applied to a front side of the organosheet and therefore the rear wall of the seat back.

In a first design variant, a preformed organosheet is inserted into an injection molding die and is encapsulated by injection molding with the thermoplastic in order to form the rib structure.

In an alternative design variant, reshaping of the organosheet is carried out directly in the injection molding die.

In the case of reshaping of the organosheet, at least one reinforcing bead and one frame-shaped bead are particularly advantageously formed, a cross section of the reinforcing beads and the frame-shaped bead being shaped out to be semicircular or partially circular. Here, the reinforcing beads are arranged and made in the organosheet in such a way that the reinforcing beads extend diagonally over the organosheet from a rear seat back bearing region to a rear seat back inner side and to the receptacle. Particularly high flexural stiffness of the rear wall of the seat back is achieved as a result.

Ribs are particularly preferably molded onto the reinforcing beads, the ribs being arranged centrally on the reinforcing beads and being widened in a base region in such a way that a pedestal-like region and an enlarged contact area which results therefrom between the base region of the rib and the reinforcing bead are formed. This makes a particularly durable material-to-material connection possible between the base region of the rib and the respective reinforcing bead.

Intersection points are shaped out at the contact points between the individual ribs of the rib structure, in each case one cutout being made in said intersection points. Here, the cutout can preferably be configured as a conventional screw hole for fastening reinforcing plates or the like.

Profile elements can expediently be molded directly onto the rib structure in the injection molding die on the edge side of the rear wall of the seat back, each profile element being coupled pivotably to the rib structure by means of an integral hinge.

After the removal of the rear wall of the seat back from the injection molding die, the profile elements can be pivoted, as a result of the integral hinges, in such a way that they cover the rib structure at least in regions, the rib structure and profile elements being connected in a material-to-material manner with the formation of a closed profile which has increased torsional stiffness and therefore reinforces the entire rear wall of the seat back.

BRIEF DESCRIPTION OF THE DRAWINGS

The organosheet is particularly advantageously not consolidated completely during processing and/or reshaping, with the result that a wall thickness of the organosheet is reduced or increased within predefinable ranges. Here, a consolidation is understood to be the production or setting of an original wall thickness of the unprocessed organosheet on the processed organosheet and therefore on the rear wall of the seat back. Different material properties can advantageously be set on the processed organosheet and therefore on the rear wall of the seat back by means of the variation of the wall thickness of the organosheet. For example, an increased wall thickness brings about an improved rate of expansion. Thus, impact regions of a payload can be configured in the rear wall of the seat back in such a way that they have an increased elastic flexibility and therefore dissipate kinetic energy of the payload in a targeted manner by means of an elastic and/or plastic deformation.

The invention will be explained in greater detail using the appended diagrammatic figures, in which.

DETAILED DESCRIPTION

Parts which correspond to one another are provided with the same designations in all the figures.

Figure 1:
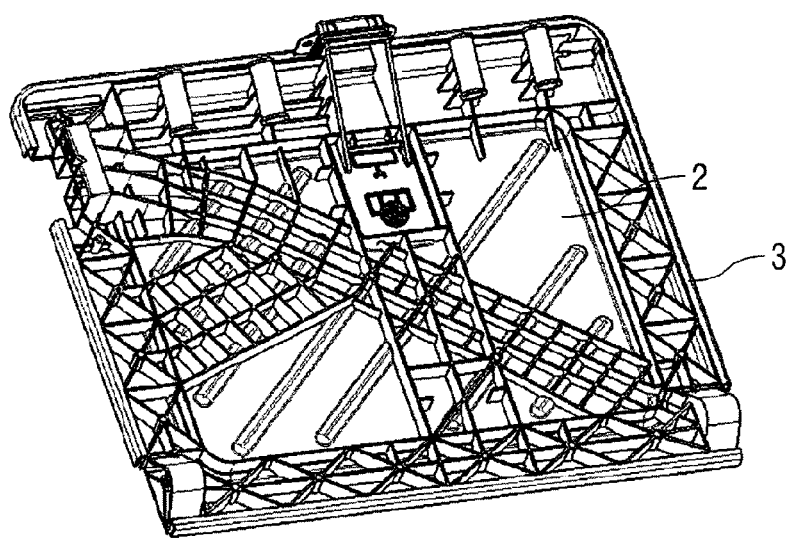
FIG. 1 diagrammatically shows a perspective illustration of a rear wall of a seat back which is produced by means of the method according to the invention, in a front view, FIG. 2 diagrammatically shows a rear view of a rear wall of a seat back which is produced by means of the method according to the invention, FIG. 3 diagrammatically shows a front view of a rear wall of a seat back which is produced by means of the method according to the invention, FIG. 4 diagrammatically shows a detailed view of a reshaped organosheet, FIG. 5 diagrammatically shows a front view of a reshaped organosheet, FIG. 6 diagrammatically shows a further front view of a rear wall of a seat back which is produced by means of the method according to the invention, FIG. 7 diagrammatically shows a sectional illustration of a rib which is molded onto a bead which is shaped out in the organosheet, FIG. 8 diagrammatically shows a detailed view of headrest bushes, FIG. 9 diagrammatically shows a further front view of a rear wall of a seat back which is produced by means of the method according to the invention, FIG. 10 diagrammatically shows a sectional illustration of a lock receptacle region which is shaped out in the rear wall of the seat back, FIG. 11 diagrammatically shows a further sectional illustration of a lock receptacle region which is shaped out in the rear wall of the seat back, FIG. 12 diagrammatically shows a further front view of a rear wall of a seat back which is produced by means of the method according to the invention, FIG. 13 diagrammatically shows a sectional illustration of a belt deflection means which is shaped out in the rear wall of the seat back, FIG. 14 diagrammatically shows a detailed view of an intersection point of the rib structure, FIG. 15 diagrammatically shows a detailed view of a lock housing which is integrated into the rear wall of the seat back, FIG. 16 diagrammatically shows a front view of a rear wall of a seat back which is produced by means of the method according to the invention, in an alternative design variant, and FIG. 17 diagrammatically shows a further front view of the rear wall of the seat back which is produced by means of the method according to the invention, in the alternative design variant.

FIG. 1 diagrammatically shows a perspective illustration of a rear wall 1 of a seat back which is produced by means of the method according to the invention, in a front view.

The rear wall 1 of the seat back is formed from what is known as an organosheet 2 and a rib structure 3.

The organosheet 2 is a conventional organosheet. An organosheet 2 is a flat semi-finished product which is made from a thermoplastic and into which a woven fabric made from glass, carbon and/or aramid fibers or a mixed form thereof is introduced in such a way that the fibers are coated completely with thermoplastic. Organosheets 2 are therefore thermoplastic panels which are reinforced by endless fibers. Organosheets 2 can be reshaped by heating and subsequent pressing in short cycle times to produce three-dimensional components.

Since the organosheet 2 has a thermoplastic matrix, it can be fused in an injection molding die (not shown) and can be encapsulated by injection molding with the same thermoplastic. In this way, the rib structure 3 which is composed of a thermoplastic which forms a material-to-material connection with the material of the organosheet 2 is applied to the organosheet 2, with the result that an integrated and therefore single-piece component is formed from the organosheet 2 and rib structure 3.

In one preferred design variant, the thermoplastic of the rib structure 3 can be composed of the same material as the organosheet 2.

In an alternative design variant, the thermoplastic of the rib structure 3 has similar or comparable properties as the material of the organosheet 2, with the result that homogeneous mixing and/or fusing of the thermoplastic of the rib structure 3 with the material of the organosheet 2 is made possible.

The rib structure 3 is preferably applied to a front side of the organosheet 2 and therefore of the rear wall 1 of the seat back.

A distinction is made here between two methods. In the first method, the preformed organosheet 2 is inserted into an injection molding die and is encapsulated by injection molding with the thermoplastic in order to form the rib structure 3. In the second method, the reshaping of the organosheet 2 is carried out directly in the injection molding die.

Figure 2:
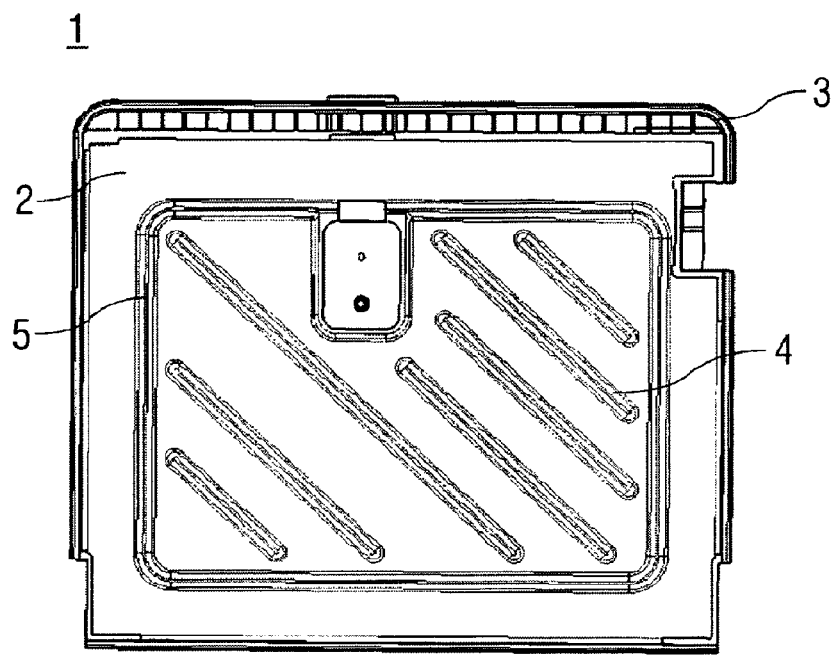

FIG. 2 diagrammatically shows a rear view of the rear wall 1 of the seat back which is produced by means of the method according to the invention. A plurality of reinforcing beads 4 are shaped out in the organosheet 2, which reinforcing beads 4 are enclosed by a circumferential frame-shaped bead 5. A cross section of the reinforcing beads 4 and the frame-shaped bead 5 is shaped out to be, in particular, semicircular or partially circular.

Figure 3:
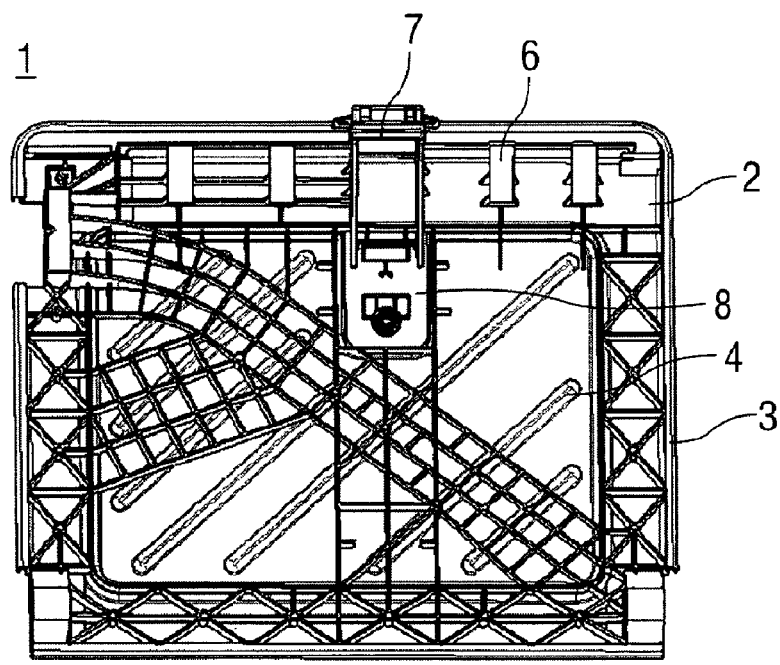

FIG. 3 diagrammatically shows a front view of the rear wall 1 of the seat back which is produced by means of the method according to the invention. Headrest bushes 6, a belt deflection means 7 and a receptacle 8 for a belt reel apparatus are shaped out in the rib structure 3.

Figure 4:
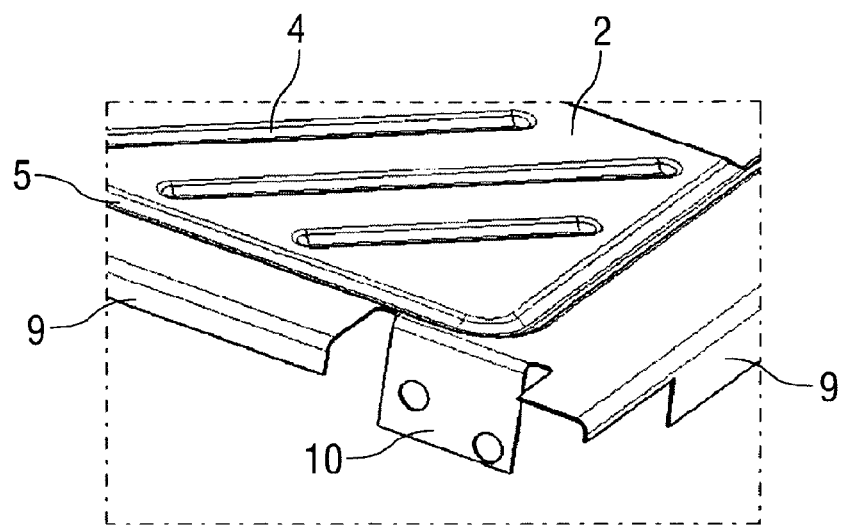

FIG. 4 diagrammatically shows a detailed view of the reshaped organosheet 2. Angled-over edges 9 and brackets 10 are formed on the edge side of the organosheet 2. During the closing of the injection molding die, said angled-over edges 9 and brackets 10 are shaped out on the organosheet 2 by means of at least one slide (not shown) in the injection molding die.

Figure 5:
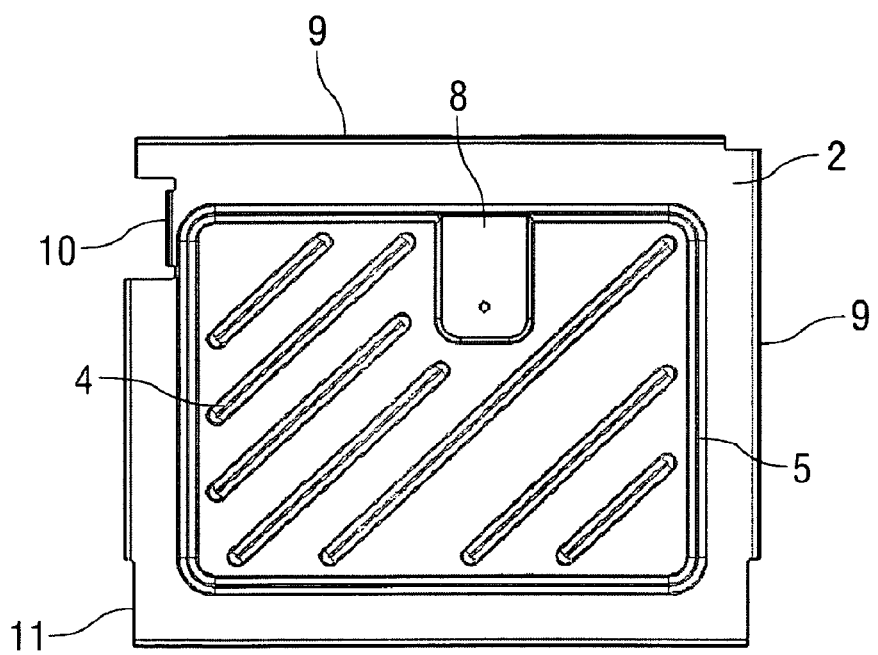

FIG. 5 diagrammatically shows a front view of a reshaped organosheet 2. An arrangement of the reinforcing ribs 4 in the organosheet 2 is effected analogously with respect to the arrangement of the reinforcing ribs in a conventional rear wall of a seat back which is produced from sheet metal. Here, the reinforcing beads 4 extend diagonally over the organosheet 2 from the rear seat back bearing region 11 to the rear seat back inner side and to the receptacle 8. The reinforcing beads 4 preferably have the same geometric dimensions as reinforcing beads in a conventional rear wall of a seat back which is produced from sheet metal.

Figure 6:
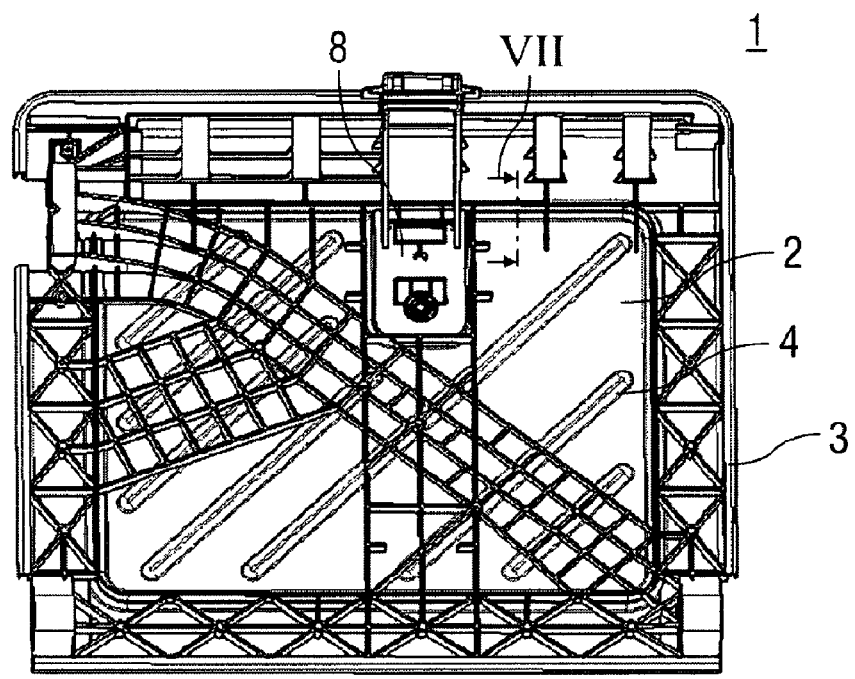
Figure 7:
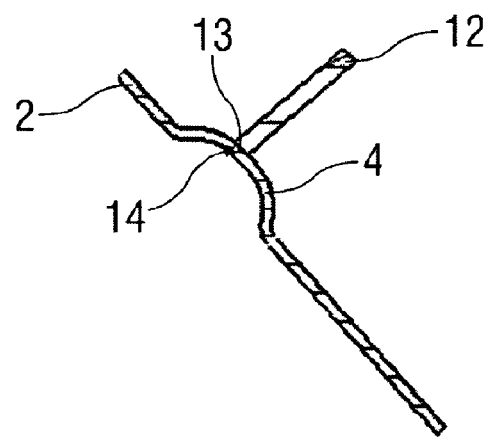

FIG. 6 diagrammatically shows a further front view of the rear wall 1 of the seat back which is produced by means of the method according to the invention, a sectional region being marked which is shown in greater detail in the sectional illustration in FIG. 7. FIG. 7 diagrammatically shows a sectional illustration of a rib 12 which is molded onto a reinforcing bead 4 which is shaped out in the organosheet 2.

Ribs 12 are preferably molded onto the reinforcing beads 4. The ribs 12 are preferably arranged centrally on the reinforcing beads 4 and are widened in a base region 13 in such a way that a pedestal-like region and an enlarged contact area 14 which results therefrom between the base region 13 of the rib 12 and the reinforcing bead 4 are formed.

Figure 8:
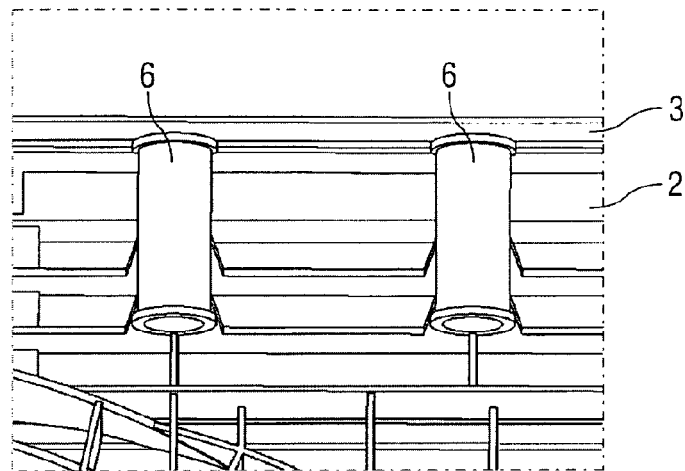

FIG. 8 diagrammatically shows a detailed view of headrest bushes 6. The headrest bushes 6 are integrated and shaped out into the rib structure 3 in the upper region of the rear wall 1 of the seat back in such a way that headrest rods of conventional headrests (not shown) can be arranged in them. The headrest bushes 6 are preferably shaped out by means of a slide in the injection molding die.

Figure 9:
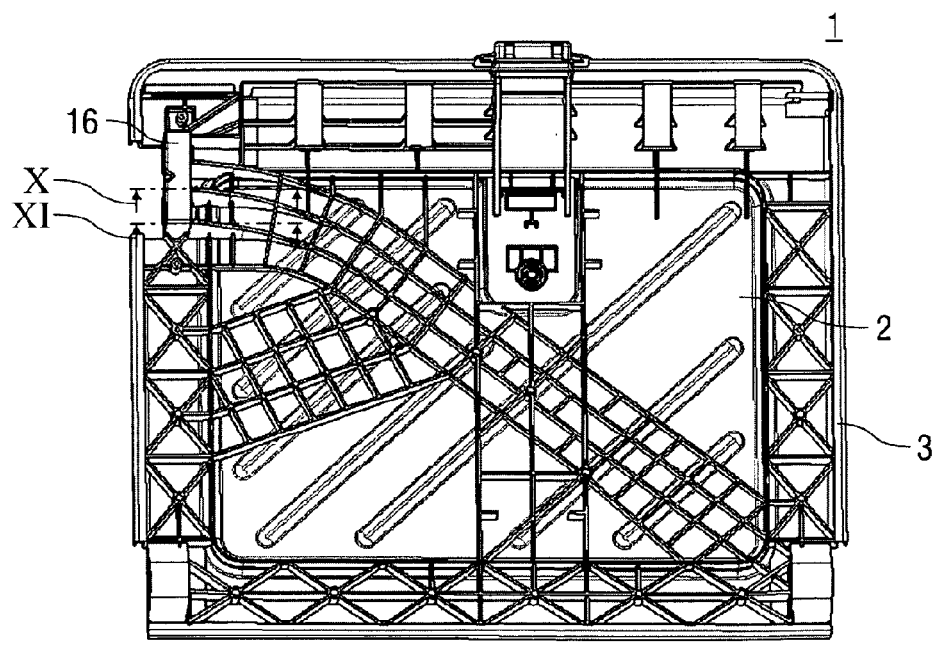
Figure 10:
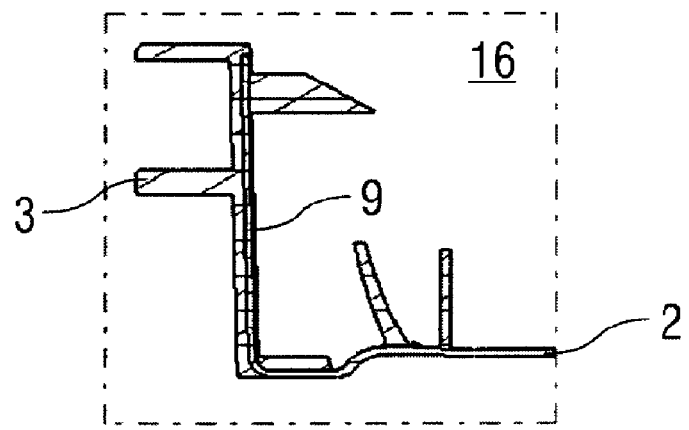
Figure 11:
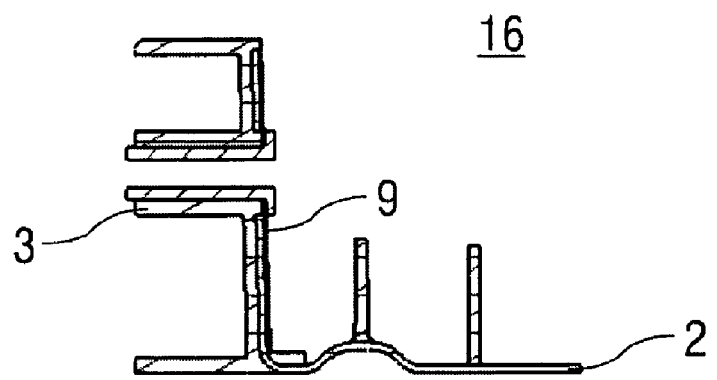

FIG. 9 diagrammatically shows a further front view of the rear wall 1 of the seat back which is produced by means of the method according to the invention, two sectional regions being marked which are shown in greater detail in the sectional illustrations in FIGS. 10 and 11. FIG. 10 diagrammatically shows a sectional illustration of a lock receptacle region 16 which is shaped out in the rear wall 1 of the seat back. FIG. 11 diagrammatically shows a further sectional illustration of the lock receptacle region 16 which is shaped out in the rear wall 1 of the seat back.

In the lock receptacle region 16, the organosheet 2 is provided on the edge side with an angled-over edge 9 in such a way that the lock (not shown) of the rear seat back is connected directly to the organosheet 2. The rib structure 3 is shaped out in the lock receptacle region 16 in a manner which corresponds to the lock of the rear seat back. The direct connection of the lock of the rear seat back to the organosheet 2 makes a particularly durable and rigid connection between both components possible.

Figure 12:
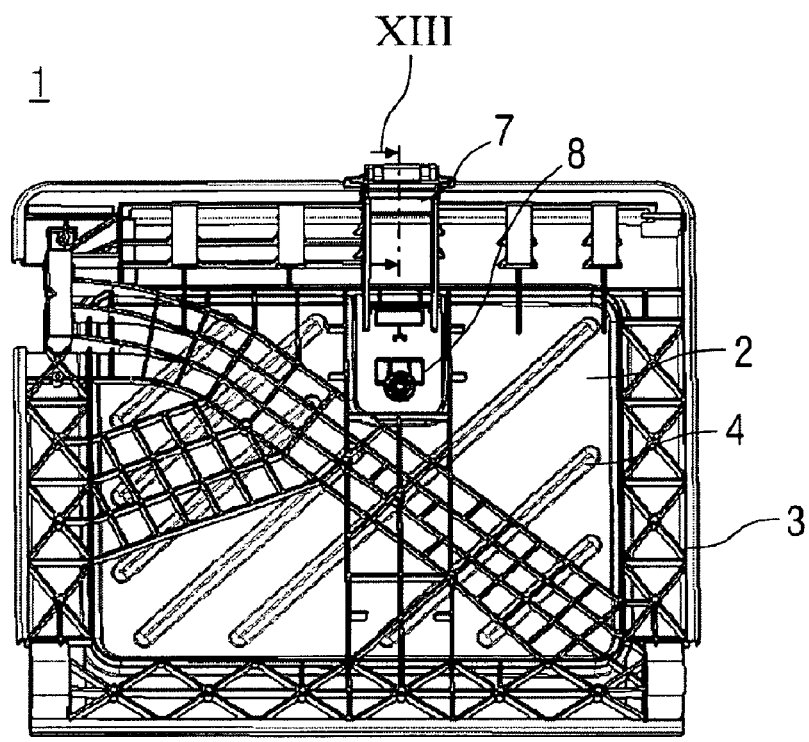
Figure 13:
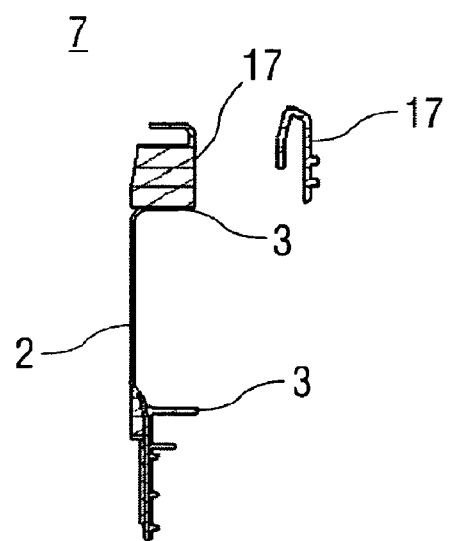

FIG. 12 diagrammatically shows a further front view of the side wall 1 of the seat back which is produced by means of the method according to the invention, a sectional region being marked which is shown in greater detail in the sectional illustration in FIG. 13. FIG. 13 diagrammatically shows a sectional illustration of the belt deflection means 7 which is shaped out in the rear wall 1 of the seat back. The belt deflection means 7 is integrated in the way shown into the rib structure 3, a wall thickness of 5 mm being shaped out in the rib structure 3 in the entire region 17 which forms the belt deflection means 7.

Figure 14:
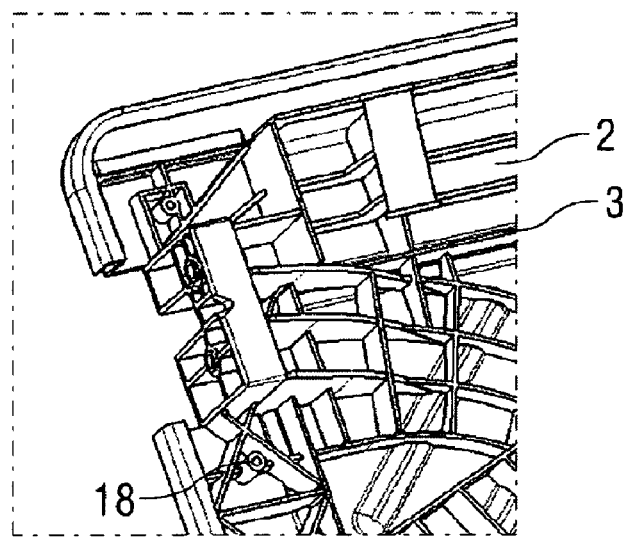
Figure 15:
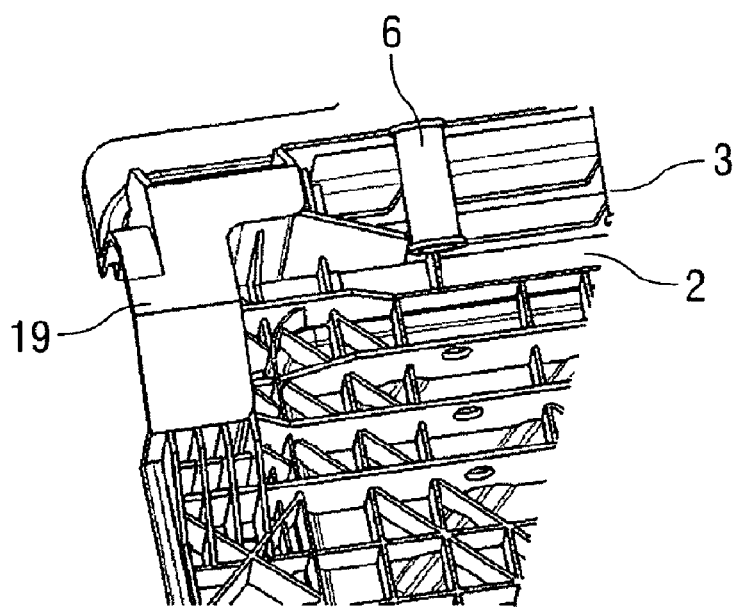

FIG. 14 diagrammatically shows a detailed view of an intersection point 18 of the rib structure 3. Regions in the rib structure 3, in which a multiplicity of ribs meet one another and form an accumulation of material, are called an intersection point 18. A hole can be made in an accumulation of material of this type or in an intersection point 18 of this type, which hole, for example, is configured as a conventional screw hole for fastening reinforcing plates or the like. The holes in the intersection points of the ribs can also be used as screw holes for fastening, for example, reinforcing plates.

FIG. 14 diagrammatically shows a detailed view of a lock housing 15 which is integrated into the rear wall of the seat back. In one particularly advantageous embodiment of the invention, the lock housing 15 is integrated into the rib structure 3 in the way shown, the lock housing 15 being shaped out so as to correspond to a belt lock triggering mechanism (not shown) which can be clipped into it. As a result, the belt lock and the belt lock triggering mechanism are reinforced significantly.

Figure 16:
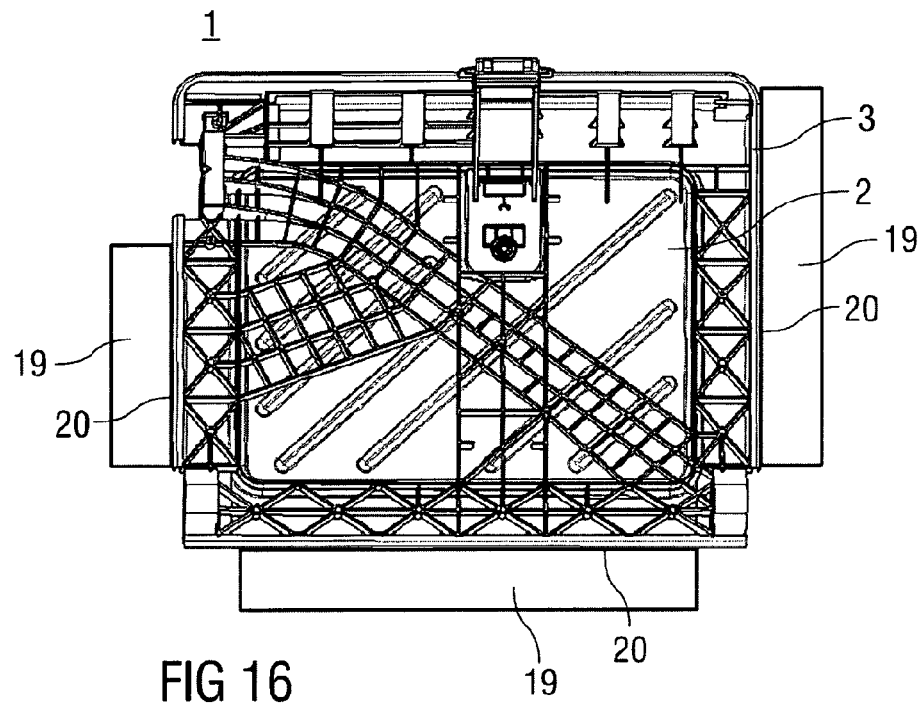

FIG. 16 diagrammatically shows a front view of a rear wall 1 of a seat back which is produced by means of the method according to the invention, in an alternative design variant. In said design variant, profile elements 19 are molded directly onto the rib structure 3 in the injection molding die on the edge side of the rear wall 1 of the seat back. The profile elements 19 are coupled pivotably to the rib structure 3 by means of conventional integral hinges 20.

Figure 17:
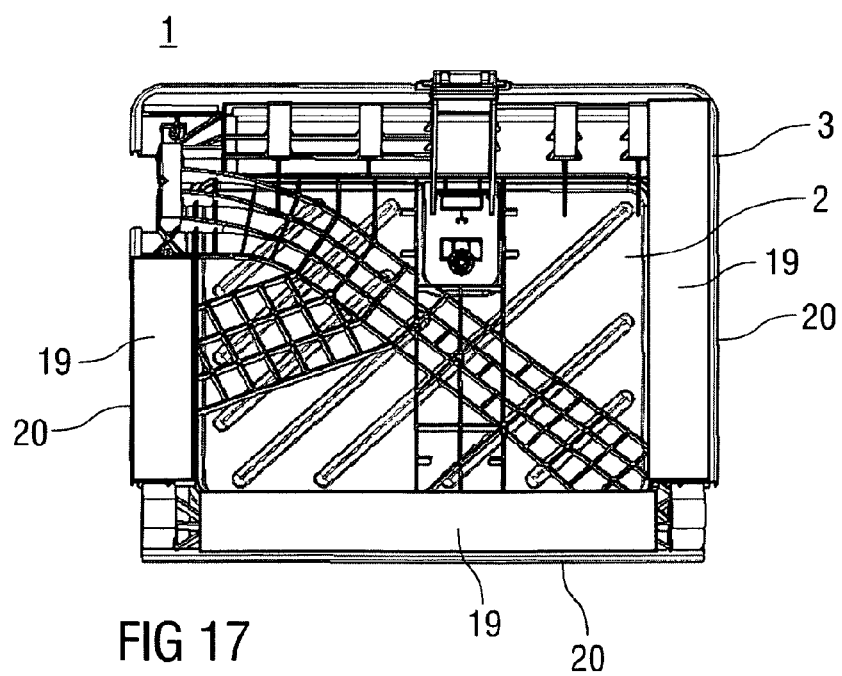

FIG. 17 diagrammatically shows a further front view of the rear wall 1 of the seat back which is produced by means of the method according to the invention, in the alternative design variant with profile elements 19 molded on. After the removal from the injection molding die, the profile elements 19 can be pivoted, as a result of the integral hinges 20, in such a way that they cover the rib structure 3 at least in regions. The integral hinges 20 can be adhesively bonded or welded to the rib structure 3, as a result of which a closed profile is produced which has increased torsional stiffness and therefore reinforces the entire rear wall 1 of the seat back.

During a processing process of the organosheet 2, the material of the organosheet 2 is usually consolidated completely. Here, consolidation is understood to be the production or setting of an original wall thickness of the unprocessed organosheet 2 on the processed organosheet 2 and therefore on the rear wall 1 of the seat back. As a result, the processed organosheet 2 has the material properties of the unprocessed organosheet 2. Here, the complete consolidation is achieved by means of a uniform press-on pressure in the injection molding die.

In one particularly advantageous embodiment, the organosheet 2 is not consolidated completely during processing and/or reshaping, with the result that a wall thickness of the organosheet 2 is reduced or increased in predefinable ranges. Different material properties can advantageously be set on the processed organosheet 2 and therefore on the rear wall 1 of the seat back by means of a variation of this type of the wall thickness of the organosheet 2. For example, an increased wall thickness brings about an improved rate of expansion and increased elasticity, resulting therefrom, of the processed organosheet 2 and therefore of the rear wall 1 of the seat back. Thus, impact regions of a payload can be configured in the rear wall of the seat back in such a way that they have an increased elastic flexibility and therefore dissipate kinetic energy of the payload in a targeted manner by means of an elastic and/or plastic deformation.

LIST OF DESIGNATIONS

1 Rear wall of a seat back
2 Organosheet
3 Rib structure
4 Reinforcing bead
5 Bead
6 Headrest bush
7 Belt deflection means
8 Receptacle
9 Angled-over edge
10 Bracket
11 Rear seat back bearing region
12 Rib
13 Base region
14 Contact area
15 Lock housing
16 Lock receptacle region
17 Region
18 Intersection point
19 Profile element
20 Integral hinge

The invention claimed is:
1. A method for producing a rear wall of a seat back from at least one organosheet, comprising:

providing an organosheet comprising a thermoplastic matrix, the organosheet having reinforcing beads on a surface of the organosheet; and overmolding the surface of the organosheet in an injection molding die with a rib structure, such that a material-to-material connection is formed between the surface of the organosheet and the rib structure wherein the organosheet and the rib structure are formed as a single-piece component.

2. The method as claimed in claim 1, wherein headrest bushes, lock housings, belt deflection mechanisms, receptacles for a belt reel apparatus and/or lock receptacle regions are molded into the rib structure.

3. The method as claimed in claim 1, wherein, during closing of the injection molding die, angled-over edges and/or brackets are shaped out on the organosheet by at least one slide.

4. The method as claimed in claim 1, wherein the rib structure is made from a thermoplastic which forms the material-to-material connection between the organosheet and the rib structure.

5. The method as claimed in claim 1, wherein the rib structure is applied to a front side of the organosheet and therefore the rear wall of the seat back.

6. The method as claimed in claim 1, wherein the organosheet is performed, further comprising inserting the organosheet into the injection molding die and encapsulating the organosheet by injection molding with a thermoplastic material in order to form the rib structure.

7. The method as claimed in claim 1, further comprising reshaping the organosheet directly in the injection molding die.

8. The method as claimed in claim 7, wherein at least one reinforcing bead and frame-shaped bead are formed when the organosheet is reshaped.

9. The method as claimed in claim 8, wherein a cross section of at least one of the reinforcing beads and/or the one frame-shaped bead is semicircular or partially circular.

10. The method as claimed in claim 8, wherein the reinforcing beads are arranged and made in the organosheet in such a way that the reinforcing beads extend diagonally over the organosheet from a rear seat back bearing region to a rear seat back inner side and to a receptacle.

11. The method as claimed in claim 8, wherein ribs are molded onto the reinforcing beads.

12. The method as claimed in claim 11, wherein the ribs are arranged centrally on the reinforcing beads and are widened in a base region in such a way that a pedestal-like region and an enlarged contact area between the base region of the rib and the reinforcing bead are formed.

13. The method as claimed in claim 11, wherein intersection points are formed at the contact points between rib structure ribs of the rib structure, wherein each of the intersection points includes an aperture.

14. The method as claimed in claim 1, wherein profile elements are molded directly onto the rib structure in the injection molding die on an edge side of the rear wall of the seat back, each profile element being coupled pivotably to the rib structure by an integral hinge.

15. The method as claimed in claim 14, wherein, the rear wall of the seat back has been removed from the injection molding die, the profile elements are pivoted, as a result of the integral hinges, in such a way that the profile elements cover the rib structure at least in regions, the rib structure and profile elements being connected in a material-to-material manner with the formation of a closed profile.

16. The method as claimed in claim 1, wherein the organosheet is not consolidated completely during processing and/or reshaping such that a wall thickness of the organosheet is reduced or increased within predefinable ranges.

* * * * *